2,756,543

PROCESS OF GROWING PLANTS BY BUDDING AND LAYERING

Klaus H. Meyer, Morrison, Colo.

No Drawing. Application June 29, 1953, Serial No. 364,907

1 Claim. (Cl. 47—58)

This invention relates to the growing and propagating of plants by budding and serpentine layering.

The achievement of Luther Burbank was getting better plants and fruit trees by cross-pollination and selection. If in plant growing we could combine the desirable traits of various varieties harmoniously into one plant by vegatative method, adding virtue to virtue, that would mean a new development in the direction of getting still better plants, especially trees and bushes. Such combinations would tend to make trees healthier, hardier, more drought-resistant, more harmonious in their metabolism and what not.

My invention relates to such a method of creating better plants. The process is that, at the time of most vigorous growth shortly after summer solstice, wiring or clamping or the like is done to the stem of a young tree, in its first year after being budded, just above the budding-point in order to arrest the downflow of sap laden with nourishment. This is causing a swelling above the wire where the sap coming down in the cambium layer enriched with nutritious and regulatory elements has been throttled. As proven by the results root-forming hormones or autacoids must be accumulating just under the outer bark where there had been none before. Within a period of about 3 months after wiring and covering the lower part of the stem with soil, genuine roots appear, this is established by experiments. The explanation can only be the forced deposition of elements stimulating root-growth at the desired point causing a spontaneous breaking forth of roots where there had been no basis for such growth before.

After removing the wire, a double-rooted plant develops, stock roots below and a stratum of genuine roots above. It goes without saying that not only two but any number of tiers of roots can be grown, one above the other, if the upper variety is budded with another variety and treated the next year in accordance with this invention. The first tier can be grown without loss of time the first year after budding the stock, but every additional tier will take another year.

Now, it is not difficult to conceive that a new development will result, because it will be possible now to grow a tree with any number and any combination of different roots. We can actually build a plant to liking, combining at will traits of different varieties vegetatively in one plant. In other words, it will be feasible to give one variety desirable traits of other varieties which so far it had been impossible to combine. The conclusion is that the lives of various plants of the same family, especially with fruit trees and bushes, can now be amalgamated or assembled biologically into a single plant by coupling the functions of divergent roots with the leaves' function of the uppermost plant into one great harmony.

Another feature of the invention is the production of mother-trees of the desired "assembled" perfection along the lines of the multifarious root-system, from which offspring can be drawn vegetatively by the wiring-process or other usual nursery practices. Such single-rooted offspring may be expected to show all the virtues embodied in the mother-plant.

Having thus described the invention, what I claim is:

Process of growing plants by a combination of budding and serpentine layering to produce a multifiarious root system, comprising the steps of budding onto the first stock, growing the bud into a branch with length enough for layering, then making the first layer and budding onto the outer end thereof, then repeating these steps of growing the last-mentioned bud into a branch, then layering and budding said branch.

References Cited in the file of this patent

UNITED STATES PATENTS 2,523,600    Stark _____ Sept. 26, 1950

OTHER REFERENCES

"The Gardener's Assistant," by Robert Thompson, published 1878 by Blackie & Son, London, England, pp. 293–296.

Thouin: "Monographie des Greffes," published before October 11, 1884, by Roret, at Paris, France. Plates 2, 5, 6 and pages 17, 18, 36–43, 58, 59, 74–77.

Farmers' Bulletin 471, "Grape Propagation . . ." pub. September 1924 by U. S. Dept. Agr., pp. 2 and 3.